R. B. FRYE.
PLANT PROTECTOR.
APPLICATION FILED JUNE 28, 1920.

1,375,583.

Patented Apr. 19, 1921.
2 SHEETS—SHEET 1.

Inventor
R. B. Frye
By Lloyd W. Patch
his Attorney

R. B. FRYE.
PLANT PROTECTOR.
APPLICATION FILED JUNE 28, 1920.
1,375,583.
Patented Apr. 19, 1921.
2 SHEETS—SHEET 2.
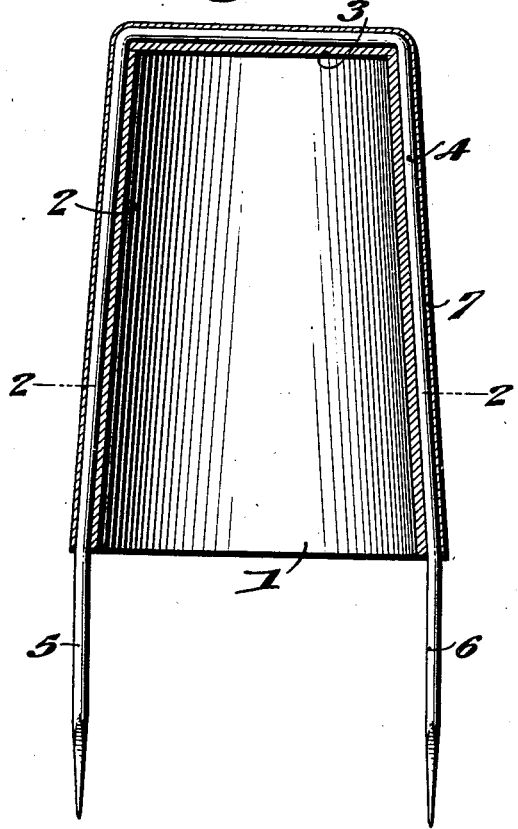
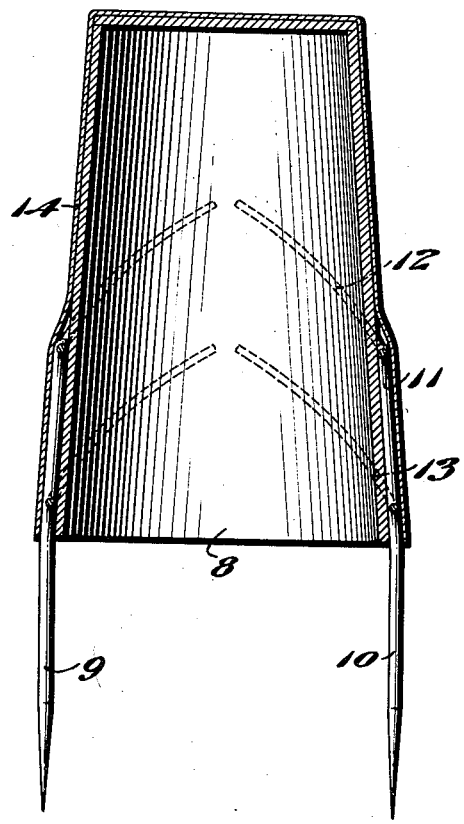
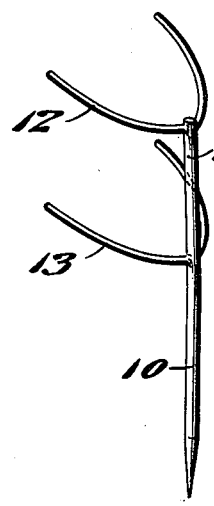
Inventor
R. B. Frye
By Lloyd W. Patch
his Attorney

UNITED STATES PATENT OFFICE.

ROBERT B. FRYE, OF PUEBLO, COLORADO.

PLANT-PROTECTOR.

1,375,583.  Specification of Letters Patent.  Patented Apr. 19, 1921.

Application filed June 28, 1920. Serial No. 392,273.

*To all whom it may concern:*

Be it known that I, ROBERT B. FRYE, a citizen of the United States, residing at Pueblo, in the county of Pueblo, State of Colorado, have invented new and useful Improvements in Plant-Protectors, of which the following is a specification.

This invention relates to plant protectors, and particularly to a device of this character designed and constructed to protect plants from frost, heat, hail, high winds and other elemental conditions, and which at the same time offers protection against the plant being trampled or broken or otherwise disturbed.

An object of my invention is to provide a plant protector which is quickly adjusted to the ground and covers the plant perfectly, means being provided to hold the protector slightly raised from the ground to give the plant air and to hold the same in place when pressed down firmly to the ground to then completely shield and cover the plant to protect the same from freezing.

Another object is to so construct the parts that the means by which the body of the plant protector is held in place is associated with said body to reinforce and strengthen the same.

Yet another object is to provide a plant protector which can be inexpensively and yet durably made and which is of such construction that a number of the plant protectors can be telescoped for close packing in shipment and when not in use, my plant protector thus adapting itself for efficient and economic use by the home gardener as well by market gardeners.

With these and other objects in view which will be apparent from the specification, drawings, and claims, this invention includes certain novel features of construction and combinations of parts which will now be set forth.

In the drawings:

Fig. 3 is a vertical sectional view through the body of the protector.

Fig. 4 is a view similar to Fig. 3 showing the employment of a modified construction.

Fig. 5 is a perspective view to better show the construction of the fastening means employed with the modified form.

Figure 1:
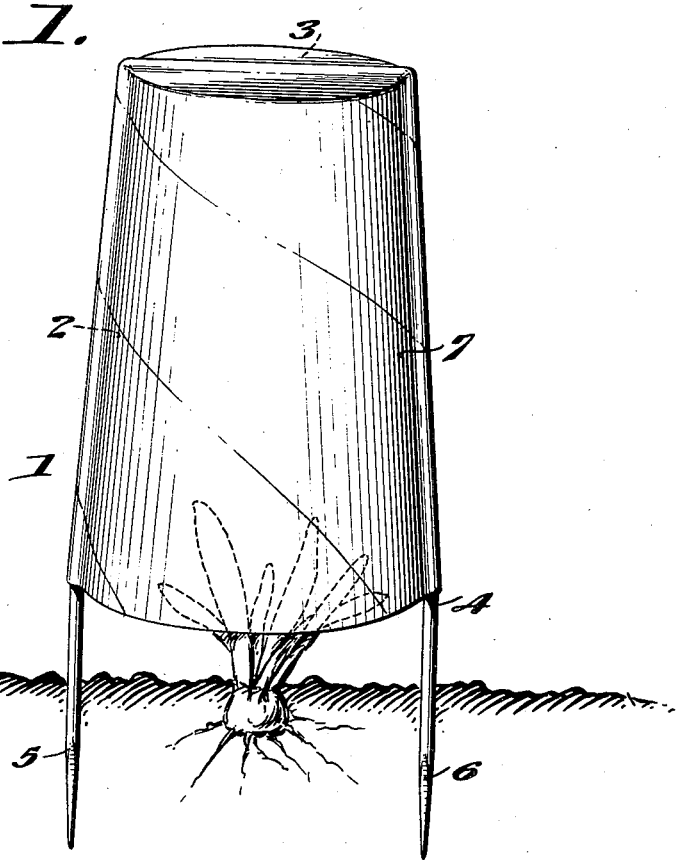
Figure 1 is a view in perspective showing a plant protector constructed after the manner of my invention as the same will appear when in use.
Figure 2:
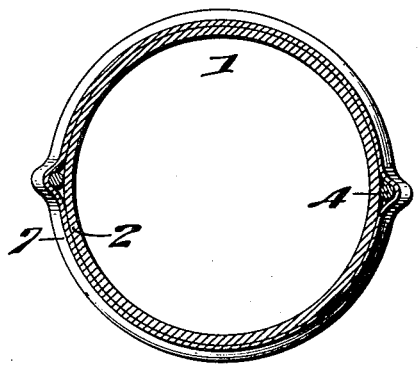
Fig. 2 is a transverse sectional view on line 2—2 of Fig. 3.

The body 1 of the protector is shaped to be of substantially truncated cone form, and these body portions are made of spirally wrapped strips of paper or strawboard, of a single sheet of material pressed or folded to take the desired shape, or may be molded or otherwise constructed out of fibrous pulp. In place of paper or pulp material cloth or other substance shaped to the desired form might be used, and under some circumstances it may be found desirable to utilize the leaf of the palm or other like material shaped in a single piece or by weaving strips together. It is preferable that a material be used which has sufficient inherent strength to withstand handling and the intended usage in exposure to the elements, and the body portions are preferably made circular in cross section and tapered throughout their length so that a number of plant protectors may be readily telescoped or fitted together for close packing.

The body portion 1 consists substantially of the side wall portion 2 and the top 3, and may be made up of one or several pieces of material.

In the preferred embodiment the fastening means consists of a band 4, formed to be substantially U-shaped and sharpened at its ends to provide anchors or sprags 5 and 6. The legs of the U-shaped band 4 are made of greater length than the side wall 2 of body portion 1, and the loop in the middle portion of the band is gaged to receive the width of the body portion at the top or head 3 so that the legs lie against the side wall of the body portion, these anchoring or sprag ends 5 and 6 being extended beyond the rim of said body and bent to be substantially parallel.

Band 4 might be secured in this relation in conjunction with the body portion by means of staples or other like fastenings, or might be connected in a number of ways; however, I have found that best results are obtained where the band is made essentially a part of and is integrally connected with the body. With this in view I have placed an outer layer 7, of paper or other suitable material, entirely over the side wall and top of the body portion and secured thereto. This outer layer holds band 4 in place and rigidly secures the same in conjunction with the body portion, leaving only the anchor ends 5 and 6 projecting beyond the rim of the body portion exposed.

In the use of my plant protector the body portion is brought vertically over a plant and by exerting pressure on the top the anchors or sprags 5 and 6 are forced into the ground by pressing the body down firmly to the ground the plant is entirely and perfectly covered, and is protected from frost, hail or high winds. Should it be desired to give the plant air it is only necessary to lift the body portion, withdrawing the anchors slightly from their positions of maximum penetration and still leaving them embedded in the earth to hold the protector against displacement and retain the same with the edge of the body spaced from the ground surface to leave an air space. To again adjust the protectors to shield against frost and high winds it is only necessary to walk along the rows and press the protectors down to bring the rim edge of the body to the ground.

Also, this device can be used with great efficiency when transplanting in hot weather, and when so used it will be necessary only to wet the surface of the ground around the plant and put the protector over the plant, leaving an air space for air to pass between the rim of the body and the ground. The wind passing over the moist earth and circulating through the air space will evaporate the water to produce a moist and cool air which will give the necessary humidity within the body of the protector to keep the plant from wilting.

In the modified form of protector, referring now to Figs. 4 and 5, the body portion 8 is made up to be of substantially the same form as set forth above, the essential difference being in the construction of the anchors or sprags. To this end the anchors 9 and 10 are each provided with a shank 11. At the end and in the middle portion of each shank arms 12 and 13 are provided. These arms of each pair, which are formed or secured to be substantially integral with the shanks, are on opposite sides of the shank, and are curved to conform substantially to the curve of the side wall of the body. To give longer contact with the body these arms may be obliquely disposed, as shown in Fig. 4. An outer layer 14 is placed over and secured in conjunction with the body portion, to rigidly hold the shanks 11 and arms 12 and 13 of the anchors or sprags 9 and 10. By this construction, and by the disposition of arms 12 and 13 a supporting metal structure is embodied in the side wall portion of the body and this structure greatly strengthens the body portion in addition to rigidly connecting the anchoring members in conjunction therewith.

While in the foregoing I have described specific embodiments, and have mentioned only certain possible modifications it will be appreciated that in practice I do not limit myself to such specific details as herein set forth, but may resort to any practical modifications falling within the scope of the invention as defined in the appended claims.

I claim:

1. A plant protector including an elongated body portion closed at one end and open at the other for placement over a plant, anchor sprags embedded in the material of the body portion and extending beyond the open end thereof.

2. A plant protector including a body portion of circular cross section open at one end and closed at the other and tapered throughout its length toward the closed end to be adaptable for telescopic packing with other like body members, an outer covering over said body portion, and anchor sprags for holding said body in position over a plant associated therewith by being secured between the body portion and said outer covering.

3. A plant protector including an elongated body portion closed at one end and open at the other for placement over a plant, a substantially U-shaped anchor having its ends formed as anchor sprags fitted over the closed end of said body portion with its legs received along the side wall thereof and the anchor sprags projecting beyond the open end, and an outer covering secured upon said body portion over said anchor to retain the same in place.

4. A plant protector including a body portion of fibrous material comprising a circular side wall tapered in size from its lower end and closed at its top, an outer covering secured over said body portion, and at least two anchor sprags associated with said body portion by being connected between the said side wall and the outer covering disposed to extend beyond the open end of said body.

In testimony whereof I affix my signature.

ROBERT B. FRYE.